(12) United States Patent
Hodgson et al.

(10) Patent No.: US 8,484,957 B2
(45) Date of Patent: Jul. 16, 2013

(54) METHOD FOR SELECTIVELY HEATING A REDUCING AGENT LINE AND DEVICE FOR EXHAUST GAS PURIFICATION IN A VEHICLE

(75) Inventors: Jan Hodgson, Troisdorf (DE); Rolf Brück, Bergisch Gladbach (DE)

(73) Assignee: EMITEC Gesellschaft fuer Emissionstechnologie GmbH, Lohmar (DE)

( * ) Notice: Subject to any disclaimer, the term of this patent is extended or adjusted under 35 U.S.C. 154(b) by 186 days.

(21) Appl. No.: 13/026,436

(22) Filed: Feb. 14, 2011

(65) Prior Publication Data

US 2011/0179773 A1 Jul. 28, 2011

Related U.S. Application Data

(63) Continuation of application No. PCT/EP2009/060372, filed on Aug. 11, 2009.

(30) Foreign Application Priority Data

Aug. 13, 2008 (DE) .................. 10 2008 038 984

(51) Int. Cl.
*F01N 3/00* (2006.01)
*F01N 3/10* (2006.01)
*F01N 3/02* (2006.01)

(52) U.S. Cl.
USPC ............... 60/295; 60/274; 60/286; 60/301; 60/303; 60/320

(58) Field of Classification Search
USPC .................. 60/274, 286, 295, 301, 303, 320
See application file for complete search history.

(56) References Cited

U.S. PATENT DOCUMENTS

| 2005/0207936 | A1 | 9/2005 | Berryhill et al. |
| 2008/0202473 | A1 | 8/2008 | Cook et al. |
| 2009/0107126 | A1* | 4/2009 | Bugos et al. ............ 60/301 |
| 2009/0127265 | A1 | 5/2009 | Magnusson et al. |
| 2009/0308466 | A1 | 12/2009 | Haeberer et al. |

FOREIGN PATENT DOCUMENTS

| DE | 10 2006 060 314 A1 | 6/2008 |
| DE | 10 2008 008 324 A1 | 8/2008 |
| DE | 10 2007 055 032 A1 | 5/2009 |
| WO | 2007/126366 A1 | 11/2007 |
| WO | 2008/074543 A1 | 6/2008 |

OTHER PUBLICATIONS

Professional Plastics, "Thermal Properties of Plastic Materials," retrieved Nov. 1, 2012.*
International Search Report of PCT/EP2009/060372 Dated Nov. 18, 2009.

* cited by examiner

*Primary Examiner* — Kenneth Bomberg
*Assistant Examiner* — Audrey K Bradley
(74) *Attorney, Agent, or Firm* — Laurence A. Greenberg; Werner H. Stemer; Ralph E. Locher

(57) ABSTRACT

A method for selectively heating a reducing agent line of an SCR device during operation of an exhaust gas purification system of an internal combustion engine and a device for exhaust gas purification, include a supply tank for a reducing agent for SCR applications, a device for introducing the reducing agent into an exhaust line of an internal combustion engine and at least one reducing agent line for fluidically connecting the supply tank to the device.

11 Claims, 2 Drawing Sheets

METHOD FOR SELECTIVELY HEATING A REDUCING AGENT LINE AND DEVICE FOR EXHAUST GAS PURIFICATION IN A VEHICLE

CROSS-REFERENCE TO RELATED APPLICATION

This is a continuation, under 35 U.S.C. §120, of copending International Application No. PCT/EP2009/060372, filed Aug. 11, 2009, which designated the United States; this application also claims the priority, under 35 U.S.C. §119, of German Patent Application DE 10 2008 038 984.6, filed Aug. 13, 2008; the prior applications are herewith incorporated by reference in their entirety.

BACKGROUND OF THE INVENTION

Field of the Invention

The present invention relates to a method for selectively heating a reducing agent line of an SCR (Selective Catalytic Reduction) device during operation of an exhaust gas purification or emission control system of an internal combustion engine and a device for purifying exhaust gas having a supply tank for a reducing agent for SCR applications, a device for introducing the reducing agent into an exhaust gas line of an internal combustion engine and at least one reducing agent line for fluidically connecting the supply tank to the device.

Due to the increased demands made of exhaust gas purification or emission control systems of internal combustion engines, in particular of diesel engines, increasingly greater use is being made of SCR systems in the exhaust systems of internal combustion engines in order to reduce the nitrogen oxides in an exhaust gas. The SCR systems at least have a supply tank for a reducing agent or a reducing agent precursor, in particular an aqueous solution of urea (for example AdBlue or denoxium), a device for introducing the reducing agent into an exhaust gas line, for example an injection device or a vaporizer unit and at least one reducing agent line for fluidically connecting the supply tank to the device for introducing the reducing agent.

In such an SCR system, the supply tank and the device for introducing the reducing agent into the exhaust gas line are frequently positioned far apart from one another in a motor vehicle, so that a line length of, for example, at least 2 m is provided between the supply tank and the device. The device for introducing the reducing agent into the exhaust gas line is disposed therein in most cases in a region of an exhaust gas line which is remote from the internal combustion engine and in which an SCR catalytic converter and, if appropriate, other exhaust gas treatment units are disposed. Since those exhaust gas treatment units are usually disposed in the outer region or underfloor region of a motor vehicle, in particular the reducing agent lines for the reducing agent between the supply tank and the device are also partially laid in the outer region of the motor vehicle. In particular, such a configuration of the reducing agent lines also occurs in the event of subsequent installation of the SCR systems (within the scope of a retrofitting measure) because those SCR systems are to be integrated as cost-effectively as possible into the existing vehicle architecture. The reducing agent line between the supply tank and the device is therefore subjected to the dynamic wind of such a motor vehicle without protection, at least in individual sections, as a result of which the convective conduction away of air which is near to the line and therefore possibly heated by the line, is increased to a great extent. As a result, additional cooling occurs, in particular of the aqueous reducing agent within the reducing agent line. The reducing agent could, under certain circumstances, be cooled below the freezing point of the reducing agent as a result of that additional so-called "wind chill factor".

Electrically heatable reducing agent lines are known from the previous prior art, but the heaters described therein are limited, in particular, to the removal region from the supply tank and/or to the pump.

It is therefore to be noted, in particular, that an SCR device is operated with the lowest possible energy consumption and that further reliable reduction of the damaging exhaust gas components is performed, irrespective of the prevailing operating conditions or environmental conditions. During the subsequent installation of such an SCR system in a motor vehicle the necessary refitting measures should additionally be as limited and correspondingly cost-effective as possible.

SUMMARY OF THE INVENTION

It is accordingly an object of the invention to provide a method for selectively heating a reducing agent line and a device for purifying exhaust gas in a vehicle, which overcome the hereinafore-mentioned disadvantages and at least partially solve the highlighted problems of the heretofore-known methods and devices of this general type and which on one hand, permit the smallest possible energy consumption to be achieved and, on the other hand, make reliable operation of the exhaust gas purification or emission control system and effective reduction of the pollutants in the exhaust gas possible.

With the foregoing and other objects in view there is provided, in accordance with the invention, a method for selectively heating a reducing agent line of an SCR device during operation of an exhaust gas purification system of an internal combustion engine. The method comprises:

a) measuring and/or calculating a heat removal from the reducing agent line in a plurality of zones of the reducing agent line;

b) identifying zones of the reducing agent line in which imminent freezing of the reducing agent can be expected; and c) activating heating energy for avoiding freezing of the reducing agent.

As a result of the selective heating, that is to say of heating of the reducing agent line in different zones of the reducing agent line independently of one another, and in particular at variable time intervals, the possibility is opened up of significantly lowering the energy consumption for operation of the SCR device. In this context, this method is, in any event, applied during operation of an exhaust gas purification or emission control system, but it can, if appropriate, also be initiated before activation of the vehicle, for example at the time when it is unlocked or when a door is opened.

In this context, the conduction away of heat or heat removal from the reducing agent line can be measured specifically within a respective zone and/or determined through the use of a calculation. The calculation can be supported, in particular, by selective measurement of individual parameters (such as temperature, pressure, etc.), with the result that the specific loss of heat of a certain surface of the reducing agent line does not have to be picked up by measuring instruments. In this context, a plurality of zones of the reducing agent line between the supply tank and a device for introducing the reducing agent into the exhaust gas line are considered so that, in particular, it is also not necessary to monitor the entire reducing agent line. In particular, zones which are subjected to an increased extent either to the ambient influences, for example dynamic wind, ambient temperature, spray water, are selected. On the other hand, certain regions which are disposed in a particularly protective fashion in the motor vehicle can be disregarded.

The zones in which freezing of the reducing agent is to be expected immediately or within a short time are identified on the basis of the measurement and/or the calculation of the conduction away of heat or heat removal according to step b).

Accordingly, according to step c) heating energy is activated so that heating energy can be fed to the reducing agent line within the identified zone or zones in order to avoid freezing in these zones.

In summary it is therefore possible, in particular, also to note that the conduction away of heat or heat removal in various zones is calculated and heating energy is supplied, if appropriate, to (at least) one of the zones if that zone is at risk of freezing. Of course, a plurality of different heating zones could also be provided for this purpose in the reducing agent line, but that increases the technical complexity and is therefore generally advisable only for exceptional situations.

In accordance with another mode of the method of the invention, at least in step a) or step b), at least the calculation of the conducting away of heat or heat removal takes into account an ambient temperature and/or a velocity of a vehicle. The velocity and/or the ambient temperature can, on one hand, be measured through the use of additional measuring instruments or else transferred from the already present vehicle systems. The two factors—ambient temperature and/or velocity—have a particularly large influence on possible freezing of the reducing agent in the zones of the reducing agent line. It is therefore also possible for the identification of zones of the reducing agent line in order to carry out step c) to take place independently of step a). Step c) is then initiated as a function of limiting values or a function of the parameters of the ambient temperature and/or velocity.

In accordance with a further mode of the method of the invention, in step a) or step b), the supply of heating energy to the reducing agent line from the components of the exhaust gas purification or emission control system and/or further heat sources of a vehicle is taken into account in the calculation of the conduction away of heat or heat removal.

A further possible way of saving energy during operation of the SCR device is to take into account the supply of heating energy to the reducing agent line. For example, a pump which heats up as a result of the operation, filters which heat up or valves which heat up and serve the purpose of conducting through the reducing agent, count as components of the exhaust gas purification or emission control system.

Further components, in particular of the vehicle, which are possible as heat sources are, for example, the internal combustion engine, the exhaust gas lines, the passenger compartment of the vehicle, airlines or the like. These components of the vehicle and also of the exhaust gas purification or emission control system can, in particular, also already be taken into account during the integration of the reducing agent line of an SCR device, with the result that the critical zones of the reducing agent line are disposed in the direct vicinity of these heat-irradiating components, wherein, of course, a possible overheating of the reducing agent line has to be taken into account.

Since, in particular, the supply of heating energy can occur very differently in individual zones of the reducing agent line, additional suitable zones in which the supplied heating energy can be determined are to be correspondingly selected. These zones can correspond to the zones for determining the conduction away of heat or heat removal.

In accordance with an added mode of the method of the invention, before step a) the zones of the reducing agent line are selected at least in terms of the parameters of ambient temperature or velocity. Particularly exposed regions of the reducing agent line are subjected to increased conduction away of heat or heat removal given appropriate ambient influences, for example as a result of the parameters of ambient temperature and velocity. These regions are accordingly at particular risk of freezing early. For this reason, the method can be selectively carried out in such a way that only these zones which are particularly at risk are monitored in the measuring routines and calculation routines according to step a).

In accordance with an additional mode of the method of the invention, the time intervals between the measurements and/or calculations in step a) are varied according to a function of at least the parameters of ambient temperature or velocity. Therefore, for particularly selected zones, the measurement routines and calculation routines according to step a) can be implemented to an enhanced degree insofar as they are monitored in shorter time intervals.

In accordance with yet another mode of the method of the invention, the heating energy is supplied by an electric heater and/or by the conveyance of reducing agent through the reducing agent line. Therefore, if it is detected by the method that a specific zone of the reducing agent line is at immediate risk of freezing, that zone can be heated either directly and exclusively by a heater which is provided or, in particular, if it is energetically more favorable, by feeding in reducing agent, for example through feeding in a recirculating fashion from the supply tank through the reducing agent line and a recirculation line. It is therefore possible to feed heating energy to the reducing agent line selectively in zones which are identified by the method and for limited time periods, with the result that the full functional capability of the device is maintained with the smallest possible use of energy.

With the objects of the invention in view, there is furthermore provided a device for exhaust gas purification in a vehicle having an internal combustion engine with an exhaust gas line. The device comprises a supply tank for a reducing agent, a device for introducing the reducing agent into the exhaust gas line, and at least one reducing agent line with a plurality of zones for connecting the supply tank to the device using fluid engineering or technology to carry out the method according to the invention.

The zones are, in particular, sections of the reducing agent line which are spatially separated from one another and in each of which at least one device for measuring measured values or a protection measure against freezing is disposed and/or can be carried out. As a result, it is possible to detect in this case, in particular, sensors, measured value pickups, heating elements, insulating devices or the like.

The reducing agent being used is, in particular, a urea/water solution with a freezing point of approximately −11° C., which is also known throughout the industry under the name AdBlue. The device for introducing the reducing agent into an exhaust gas line of an internal combustion engine, in particular of a diesel engine is, for example, an injection nozzle or a vaporization unit through the use of which the reducing agent is introduced as finely distributed as possible into the exhaust gas stream. The at least one line, which is, if appropriate, also embodied in a plurality of parts for fluidically connecting the supply tank and the device includes, in particular, insulated, flexible hose materials or metallic tubes, in particular stainless steel tubes, which can, in particular, be at least partially heated.

In accordance with another feature of the invention, at least one wind protection element is provided for reducing the conduction away of heat radiation from the reducing agent line, in such a way that a gas cannot flow through the at least one wind protection element. The at least one wind protection element is disposed at a distance of less than 100 mm from the line.

The at least one wind protection element is provided in this case, in particular, in the regions of the reducing agent lines which are, for example, subjected to a dynamic wind impinging upon a motor vehicle. The heat of the reducing agent which is irradiated by the line is conducted away to an increased degree by the dynamic wind of the motor vehicle. In particular, at low ambient temperatures, this dynamic wind generates strong cooling of the reducing agent line surface by the conduction away of the ambient air which is near the line. At high wind speeds and given an ambient air temperature near the freezing point of the reducing agent, it is therefore nevertheless possible for the reducing agent to freeze and for the emission control by the SCR system to fail. The provision of heatable reducing agent lines (alone) may then also not be sufficient.

The wind protection element is accordingly disposed in such a way that a gas, in particular the dynamic wind, is diverted around the reducing agent line in such a way that an exchange of air or movement of air in the direct environment of the reducing agent line is largely avoided. Accordingly, a gas cannot flow through the wind protection element, that is to say in particular it is not perforated and can preferably be manufactured from plastic, from lightweight metals or at least partially from naturally renewable raw materials.

The distance between the wind protection element and the reducing agent line is not greater than 100 mm, in particular less than 80 mm and particularly preferably less than 50 mm, in this case. The distance is defined in this case as the distance between a surface of the wind protection element facing the reducing agent line and the surface of the reducing agent line facing the wind protection element.

The wind protection element can also be used for protecting other components of an SCR system which are exposed or around which a gas flows. In particular, it is therefore also possible to protect filters, pumps, valves, reducing agent reservoirs outside the supply tank and injection nozzles through the use of a wind protection element.

In accordance with a further feature of the invention, the device is preferably configured in such a way that the wind protection element covers less than 270° of the circumference of at least one cross section of the line. This is intended to clarify, in particular, the fact that it is not in this case a matter of insulation of the reducing agent line but rather a separate component which is, if appropriate, attached to suitable points of the vehicle body and is therefore even additionally used for any insulation or heating devices of the reducing agent line and is intended to reduce the convection of the ambient air near the line. In particular, in the case of a planar wind protection element which is embodied in a largely flat fashion it is sufficient to cover the circumference of at least a cross section of the reducing agent line over a region of less than 180° and, in particular, of less than 90°, so that a corresponding effect can be detected. Preferably, the wind protection element does not cover more than 270° of the reducing agent line at any cross section of the reducing agent line.

In accordance with an added feature of the invention, the wind protection element is connected to the reducing agent line at a connection only through an insulation device, in which the insulation device has a heat conductance value of at maximum 0.1 W/mK [Watt/meter*Kelvin]. This therefore applies, in particular, in the case in which the wind protection element is connected to the reducing agent line itself, for example through a collar or a similar clamping device. The insulation device is intended to ensure thermal coupling between the reducing agent line and the wind protection element.

The device according to the invention can be used, in particular, in motor vehicles, in particular in trucks, in which the exhaust systems are frequently disposed in such a way as to be exposed in the outer region of the vehicle, as a result of which there is a particular need for a method according to the invention or for a corresponding device in this case. In addition, non-road vehicles such as, for example, land agricultural machines, can also profit from such a method according to the invention.

It is to be noted that the concept of wind protection as a protection against freezing for HWL devices in mobile systems can also be used independently of the method of selective heating.

Other features which are considered as characteristic for the invention are set forth in the appended claims, noting that the features which are individually specified in the dependent claims can be combined with one another in any desired technically appropriate way and define further embodiments of the invention.

Although the invention is illustrated and described herein as embodied in a method for selectively heating a reducing agent line and a device for exhaust gas purification in a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
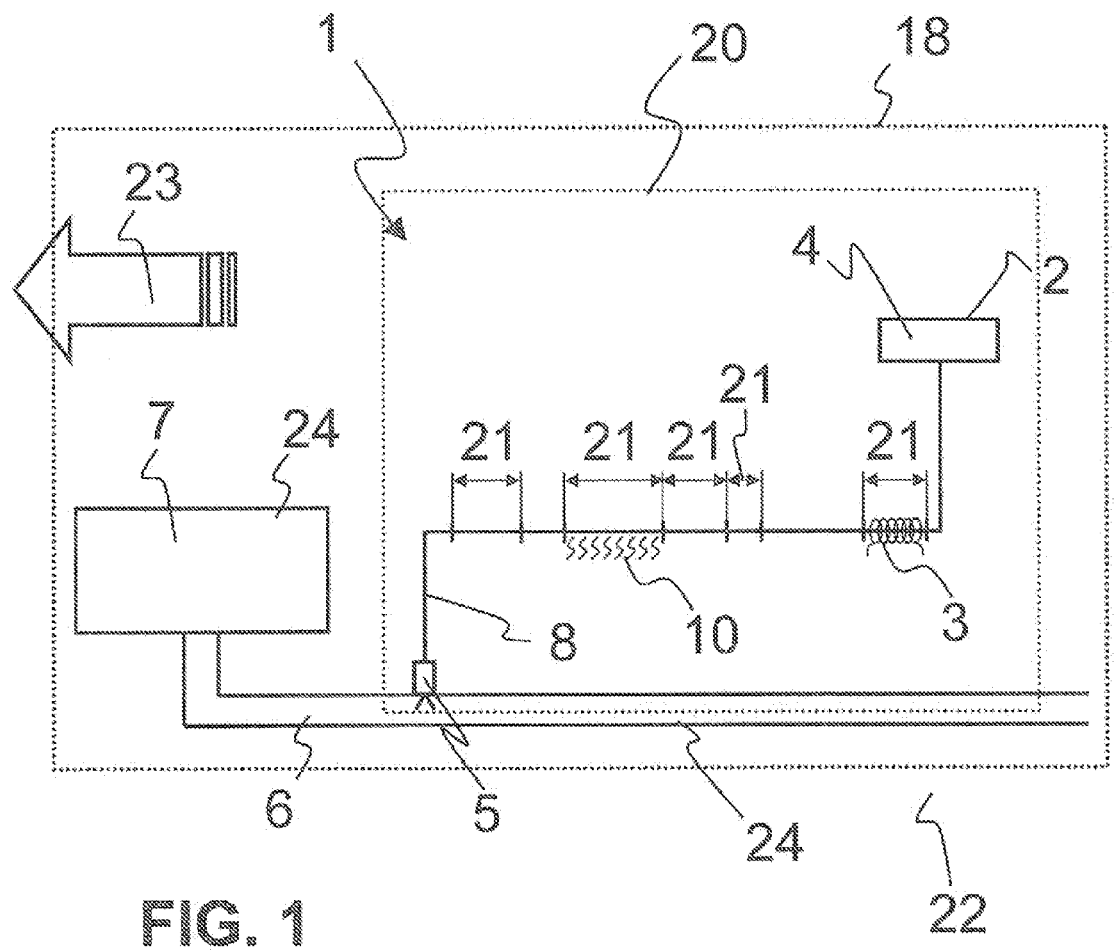
FIG. 1 is a diagrammatic, plan view of a vehicle with a device according to the invention.

Referring now in detail to the figures of the drawing for explaining the invention and the technical field in more detail by showing particularly preferred structural variants to which the invention is not restricted, and first, particularly, to FIG. 1 thereof, there is seen a diagrammatic illustration of a motor vehicle 18 having an internal combustion engine 7, an exhaust gas line 6, a device 5 for introducing a reducing agent 4 at a point along the exhaust gas line 6, and an exhaust gas purification or emission control system 20 having a device 1 for exhaust gas purification or emission control in the vehicle 18. The device 5 is connected in this case through a reducing agent line 8 to a supply tank 2 in which a sufficient quantity of the reducing agent 4 is held. The reducing agent line 8 can be divided in this case, over parts of its extent, into a plurality of zones 21 in which a conduction away of heat or heat removal 10 can be measured and/or calculated. At the same time, identical zones 21 or other zones 21 are provided, in which heating energy, for example in the form of a heater 3, can be fed to the reducing agent line 8. Significant influencing factors on the conduction away of heat 10 from the reducing agent line 8 are the velocity 23 of the motor vehicle 18 and/or ambient temperature 22. In particular, heat-emitting components 24 of the vehicle, for example the internal combustion engine 7 and exhaust gas line 6, are significant influencing factors on the supply of heating energy.

Figure 2:
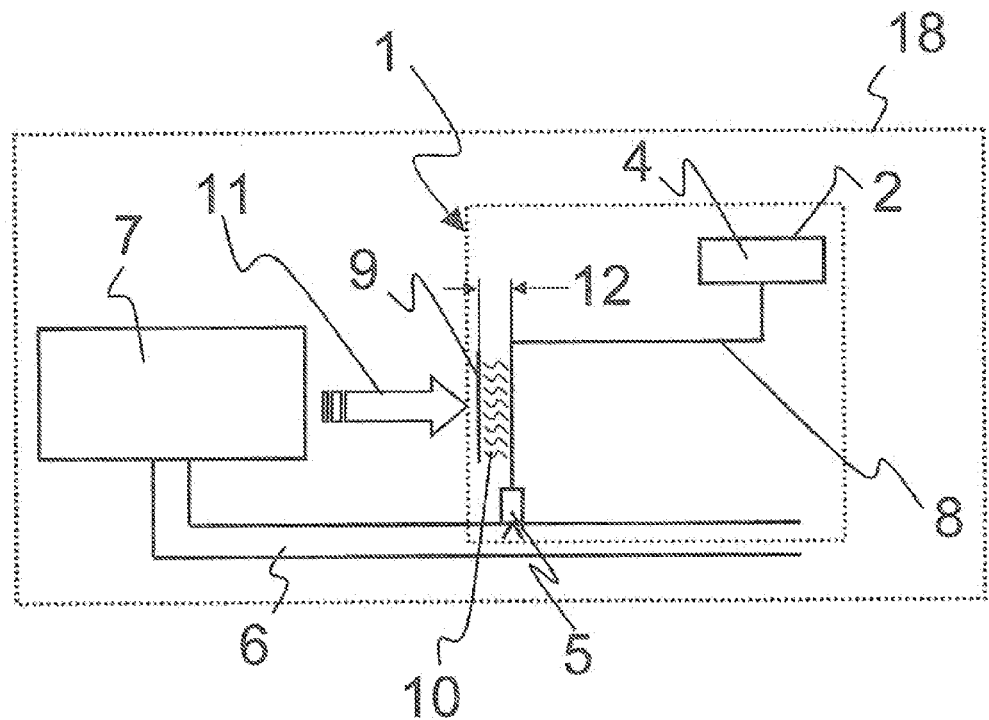
FIG. 2 is a view similar to FIG. 1 showing a particular embodiment of the device.

FIG. 2 is a diagrammatic view of a motor vehicle 18 with an internal combustion engine 7 and an exhaust gas line 6, wherein a device 5 for introducing a reducing agent 4, in particular a reducing agent 4 for reducing the nitrogen oxides in an exhaust gas, is provided at a point along the exhaust gas line 6. The device 5 is connected in this case through a reducing agent line 8 to a supply tank 2 in which a sufficient quantity of the reducing agent 4, in particular a reducing agent precursor, is held. The reducing agent line 8 is laid in this case in wind-protected regions of the motor vehicle 18 along parts of its extent, in particular it benefits at points near to the engine from the dissipated heat generated there so that additional lining or insulation of the reducing agent line 8 does not necessarily have to be provided in these sections. However, in other parts of the reducing agent line 8, the latter is subjected to a gas 11, in particular an air stream, which is caused, for example, by the velocity 23 of the motor vehicle 18. The gas 11 would increase the conduction away of heat or heat removal 10 of the reducing agent line 8 in this region. Therefore, in these regions, a wind protection element 9 is provided which can at least reduce the conduction away of heat 10 by the gas 11 flowing past, in particular the dynamic wind. The wind protection element 9 is disposed in this case at a distance 12 from the reducing agent line 8.

Figure 3:
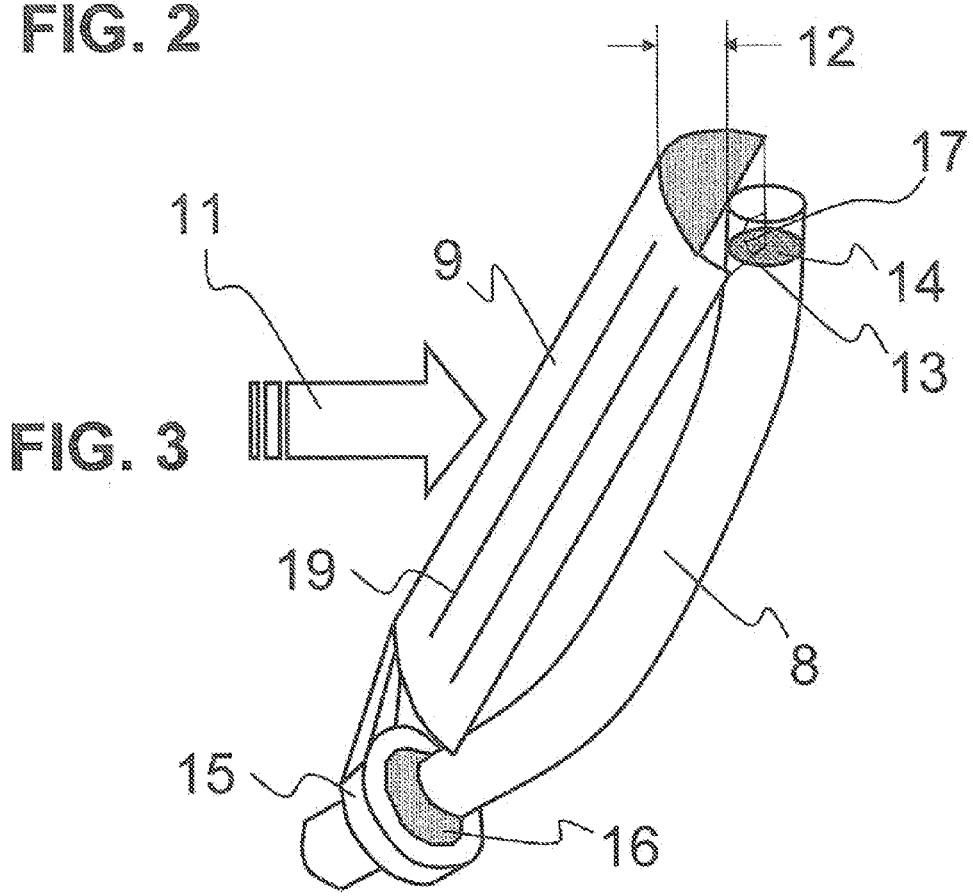
FIG. 3 is a perspective view of a line section with a wind protection element.

FIG. 3 is a diagrammatic, perspective view of an exposed section of the reducing agent line 8 which is covered against or with respect to a gas 11 flowing past, in particular a dynamic wind, by a wind protection element 9 over a certain circumferential region. It is illustrated therein that the wind protection element 9 is connected to the reducing agent line 8 at least in a region by a connection 15. The connection 15 has an insulation device 16 which is intended to prevent additional conduction away of heat or heat removal 10 from the reducing agent line 8 to the mass of the wind protection element 9. The wind protection element 9 is disposed at a distance 12 from the reducing agent line 8. This distance 12 is defined as a distance between the surfaces of the wind protection element 9 and of the reducing agent line 8 which face one another. The wind protection element 9 is, in particular, embodied with a round shape and covers the line 8 over a circumference 13 of its surface in the region of at least one cross section 14. In this context, the reducing agent line 8 is covered over an angular range 17, starting from the center point of the reducing agent line 8, so that conduction away of ambient air of the reducing agent line 8 near to the surface as a result of a gas 11 flowing past is avoided. The shape of the wind protection element 9 can also be adapted, in particular, to the position of the reducing agent line 8, and can have at least partially reinforcing structures 19 which increase the dimensional stability of the wind protection element 9.

The invention claimed is:

1. A method for selectively heating a reducing agent line of an SCR device during operation of an exhaust gas purification system of an internal combustion engine, the method comprising the following steps:
   a) at least one of measuring or calculating a heat removal from the reducing agent line in a plurality of zones of the reducing agent line;
   b) identifying zones of the reducing agent line in which imminent freezing of the reducing agent can be expected; and
   c) activating heating energy for avoiding freezing of the reducing agent.

2. The method according to claim 1, which further comprises, at least in step a) or step b), taking at least one of an ambient temperature or a velocity of a vehicle into account at least for the step of calculating the heat removal.

3. The method according to claim 1, which further comprises, in step a) or step b), taking at least one of a supply of heating energy to the reducing agent line from components of the exhaust gas purification system or further heat sources of a vehicle into account at least for the step of calculating the heat removal.

4. The method according to claim 1, which further comprises, before step a), selecting the zones of the reducing agent line according to a function of at least parameters of ambient temperature or velocity of a vehicle.

5. The method according to claim 1, which further comprises varying time intervals between measuring or calculating in step a) according to a function of at least parameters of ambient temperature or velocity of a vehicle.

6. The method according to claim 1, which further comprises supplying the heating energy by at least one of an electric heater or a conveyance of reducing agent through the reducing agent line.

7. A device for exhaust gas purification in a vehicle having an internal combustion engine with an exhaust gas line, the device comprising:
   a supply tank for a reducing agent;
   a device for introducing the reducing agent into the exhaust gas line;
   at least one reducing agent line with a plurality of zones for fluidically connecting said supply tank to said device for introducing the reducing agent; and
   a controller configured for performing the following:
      a) at least one of measuring or calculating a heat removal from said reducing agent line in a plurality of said zones of said reducing agent line;
      b) identifying zones of said reducing agent line in which imminent freezing of the reducing agent can be expected; and
      c) activating heating energy for avoiding freezing of the reducing agent.

8. The device according to claim 7, which further comprises at least one wind protection element for reducing heat removal from said at least one reducing agent line and preventing a gas from flowing through said at least one wind protection element, said at least one wind protection element being disposed at a distance of less than 100 mm from said at least one reducing agent line.

9. The device according to claim 8, wherein said at least one wind protection element covers less than 270° of a circumference of at least one cross section of said at least one reducing agent line.

10. The device according to claim 8, wherein said at least one wind protection element covers no more than 270° of said at least one reducing agent line at any cross section of said at least one reducing agent line.

11. The device according to claim 8, which further comprises a connection connecting said at least one wind protection element to said at least one reducing agent line only through an insulation, and said insulation has a heat conductance value of at most 0.1 W/(mK).

* * * * *